(12) United States Patent
Sudarsan et al.

(10) Patent No.: US 10,484,844 B2
(45) Date of Patent: Nov. 19, 2019

(54) SIMPLIFIED SHORT MESSAGE SERVICE (SMS) PROCEDURE FOR COMMUNICATION WITH INTERNET OF THINGS DEVICES

(71) Applicants: Nokia Solutions and Networks Oy, Espoo (FI); Alcatel Lucent, Boulogne-Billancourt (FR)

(72) Inventors: Padmavathi Sudarsan, Naperville, IL (US); Fernando Cuervo, Dunrobin (CA); Subhasis Laha, Naperville, IL (US); Ranga Tota, Naperville, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 22 days.

(21) Appl. No.: 15/855,517

(22) Filed: Dec. 27, 2017

(65) Prior Publication Data
US 2019/0200178 A1 Jun. 27, 2019

(51) Int. Cl.
*H04W 68/00* (2009.01)
*H04W 4/14* (2009.01)
*H04L 12/58* (2006.01)
*H04W 52/02* (2009.01)
*H04L 29/08* (2006.01)

(52) U.S. Cl.
CPC ............... *H04W 4/14* (2013.01); *H04L 51/24* (2013.01); *H04W 52/0229* (2013.01); *H04W 68/005* (2013.01); *H04L 67/12* (2013.01)

(58) Field of Classification Search
CPC . H04W 4/14; H04W 68/005; H04W 52/0229; H04L 51/24; H04L 67/12
USPC .................................. 455/458; 370/338
See application file for complete search history.

(56) References Cited

U.S. PATENT DOCUMENTS

2018/0227837 A1* 8/2018 Starsinic ............... H04W 4/70

FOREIGN PATENT DOCUMENTS

WO 2017058287 A1 4/2017

OTHER PUBLICATIONS

Defintion Networks, "3GPP SCEF Primer", <http://definitionnetworks.com/3gpp-scef-primer/>, Accessed on Dec. 27, 2017, 5 pages.
Bhaskaran, S., "Cellular Insights", <http://cellularinsights.blogspot.in/>, Accessed on Dec. 23, 2017, 4 pages.

(Continued)

*Primary Examiner* — Marcos Batista

(57) ABSTRACT

A service capability exposure function (SCEF) receives a short message service (SMS) message associated with a user equipment. The SCEF identifies a destination for the SMS message on the basis of a mapping between a unique identifier of the user equipment and an external identifier of the user equipment. The SCEF transmits the SMS message towards the destination. Receiving the SMS message and transmitting the SMS message are performed without establishing a packet data network (PDN) session for conveying the SMS message. A mobility management entity (MME) receives the SMS message and identifies the destination for the SMS message on the basis of a unique identifier of the user equipment included in the SMS message. The MME transmits the SMS message towards the destination.

22 Claims, 8 Drawing Sheets

(56) References Cited

OTHER PUBLICATIONS

Cisco, "Non-IP Data Over SCEF", <https://www.cisco.com/c/en/us/td/docs/wireless/asr_5000/21-3_N5-5/Ultra_IoT_CSGN/21-3-Ultra-IoT-CSGN-Guide/21-3-Ultra-IoT-CSGN-Guide_chapter_0100.pdf>, Accessed on Dec. 23, 2017, 22 pages.

Antipolis, S., "33rd Generation Partnership Project; Technical Specification Group Services and System Aspects; Telecommunication management; Charging management; Control Plane (CP) data transfer domain charging; (Release 13)", 3GPP TS 32.253, 29 pages.

Defintion Networks, "3GPP NIDD Via SCEF for NB-IOT", <http://definitionnetworks.com/3gpp-nidd-via-scef-nb-iot/>, Accessed on Dec. 27, 2017, 7 pages.

Bhaskaran, S., "Cellular Insights", <http://cellularinsights.blogspot.in/>, Accessed on Dec. 23, 2017, 2 pages.

International Search Report and Written Opinion dated Apr. 2, 2019 for PCT/US2018/067719, 19 pages.

"3rd Generation Partnership Project; Technical Specification Group Services and System Aspects; Architecture enhancements for service capability exposure (Release 13)", 3GPP TR 23.708, V13.0.0, Jun. 2015, 31 pages.

"3rd Generation Partnership Project; Technical Specification Group Services and System Aspects; Architecture enhancements to facilitate communications with packet data networks and applications (Release 14)", 3GPP TS 23.682, V14.6.0, Dec. 2017, 107 pages.

"3rd Generation Partnership Project; Technical Specification Group Core Network and Terminals; Diameter based protocols to support Short Message Service (SMS) capable Mobile Management Entities (MMEs) (Release 15)", 3GPP TS 29338, V15.0.0, Sep. 2017, 50 pages.

"RESTful Network API for Short Messaging", Open Mobile Alliance, OMA-TS-REST_NetAPI_ShortMesaging-V1_0-20151023-C, Candidate Version 1, Oct. 23, 2015, 109 pages.

\* cited by examiner

SIMPLIFIED SHORT MESSAGE SERVICE (SMS) PROCEDURE FOR COMMUNICATION WITH INTERNET OF THINGS DEVICES

BACKGROUND

The "Internet of Things" (IoT) is designed to support inter-networking of physical devices such as appliances, vehicles, buildings, and other items that are embedded with electronics, software, sensors, actuators, and network connectivity to enable the devices to collect and exchange data over the Internet. The IoT ecosystem involves a diverse user base that spans numerous vertical markets including industrial applications, smart homes, telematics, wearables, automotive fleet management, smart traffic applications, provision of real-time traffic information, security monitoring and reporting, utilities, vending machines, healthcare metering and alerting, and the like. A large (and rapidly growing) number of IoT devices support cellular access, e.g., access according to standards defined by the Third Generation Partnership Project (3GPP). Current estimates predict there will be 20-100 billion IoT devices in operation by 2020. Approximately 20% of IoT devices are expected to support cellular technology by 2020, which corresponds to an estimated 4 to 10 billion cellular-enabled IoT devices.

Application servers in the IoT ecosystem provide information or instructions to devices in the IoT ecosystem by transmitting queries. Queries are used to initiate actions such as data collection by the devices, to request transmission of the collected data from the devices to the application server, to provide data such as software upgrades to the devices, to notify devices of upcoming broadcast transmissions from the application server, and the like. Most of the queries are non-time critical queries having relatively small numbers of bytes that are transmitted to the IoT devices, e.g., a request to turn on the air conditioning in a connected car. Short message service (SMS) messages provide a straightforward way to exchange small amounts of data between application servers and IoT devices. The SMS messages are used to trigger actions at the IoT device such as shutdown, rebooting, reconfiguration of a reporting time interval, and the like. The SMS messages are also able to instruct IoT devices to establish a connection (such as a packet data network, PDN, connection) that is subsequently used for delivery of other types of data such as software upgrade packages.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
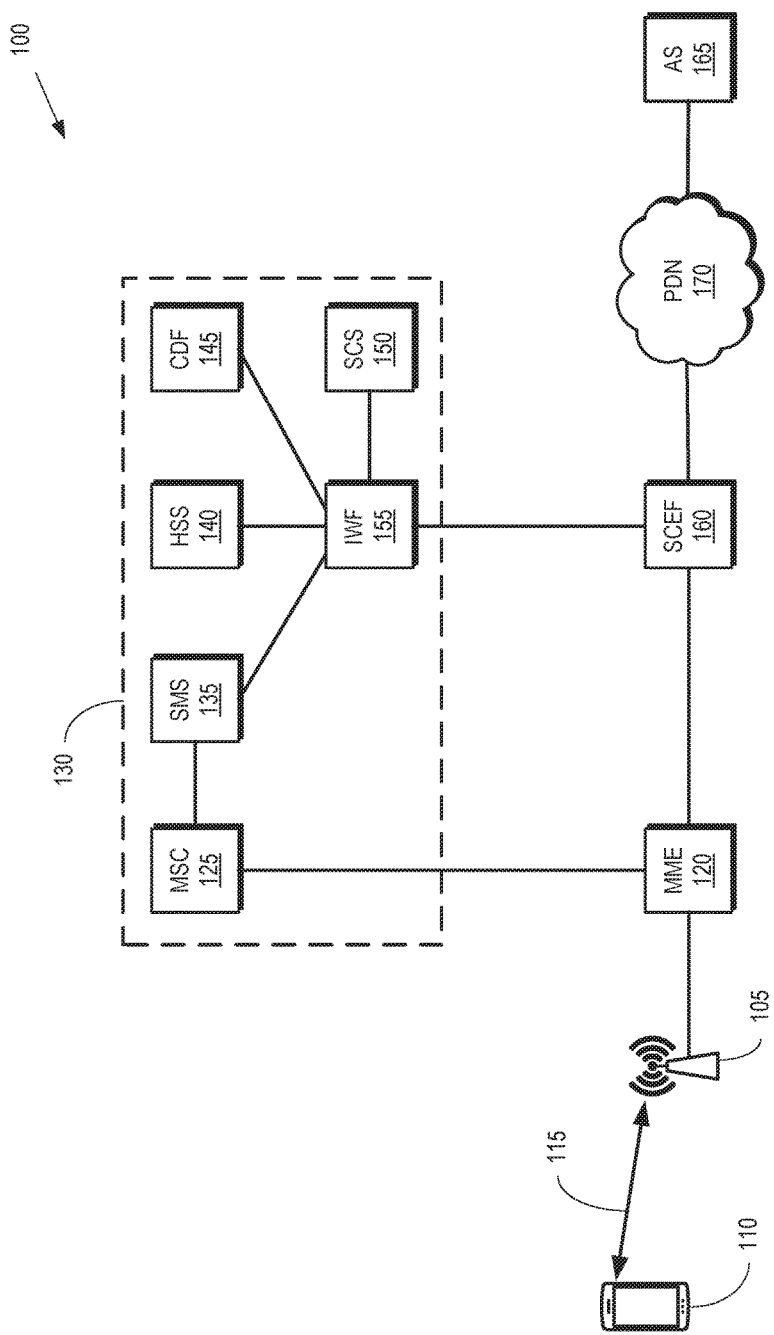
FIG. 1 illustrates a wireless communication system that supports delivery of short message service (SMS) messages according to the Third Generation (3G) standards defined by the Third Generation Partnership Project (3GPP).

Conventional SMS messages are delivered using a circuit-switched architecture according to standards defined by the 3GPP. The circuit-switched path includes a service capability exposure function (SCEF) that receives SMS messages from the application server, an interworking function (IWF), a short message service center (SMSC) to store, forward, convert, and deliver the SMS messages, a mobile switching center (MSC), and a mobility management entity (MME). The conventional circuit-switched architecture also requires additional support functions for SMS messages including a charging data function (CDF) and a services capability server/application server (SCS/AS). However, the conventional circuit-switched architecture is being phased out and future networks are not expected to implement the functionality needed to support circuit-switched SMS messaging. Furthermore, deploying elements of the circuit-switched architecture to support SMS messaging to IoT devices is expected to be cost prohibitive, at least in part because of the large number of IoT devices that will need to be supported.

Small amounts of data are also conventionally transmitted to user equipment using non-Internet protocol (IP) data delivery between an SCEF and an MME. Non-IP data delivery can therefore be used to support exchange of small amounts of data between IoT devices and an application server. However, non-IP data delivery requires establishing a PDN connection between the user equipment and a PDN, which incurs a significant amount of overhead. The user equipment is required to perform a PDN attach/connectivity procedure to register with the MME and then transmit a connection management request to the SCEF. The application server registers with the user equipment for the non-IP data delivery and the SCEF authenticates and authorizes the request on the basis of information provided by an HSS. Once the user equipment and the application server are successfully registered for non-IP data delivery using the PDN connection, the MME and the SCEF exchange messages to negotiate a connection. The PDN connection creation procedure is completed when the MME transmits an acceptance message including an identifier of a bearer to be used by the user equipment for non-IP data delivery. The overhead incurred by the PDN creation procedure is undesirable, and possibly prohibitive, when scaled to support the expected number of IoT devices.

FIGS. 1-8 disclose techniques for exchanging SMS message among application servers and user equipment without incurring the overhead of the conventional 3GPP SMS architecture or the connection establishment procedure used for non-IP data delivery by conveying SMS messages between an MME and an SCEF associated with the user equipment on the basis of a unique identifier of the user equipment, such as an international mobile subscriber identity (IMSI), without establishing a PDN connection for the user equipment. The MME selects the SCEF in response to receiving an attach message from the user equipment including a request for SMS messaging and the SCEF notifies the application server that the user equipment is available for SMS messaging. The user equipment is identified to the application server using an external identifier such as a mobile station international subscriber directory number (MSISDN) and the SCEF is configured to map the external identifier to the unique identifier of the user equipment. The MME routes SMS messages on the basis of the unique identifier and the SCEF is able to route messages on the basis of either the unique identifier or the external identifier, depending on the direction of the SMS message.

Mobile-terminated SMS messages including the external identifier are received by the SCEF, which maps the external identifier to the unique identifier and identifies the MME on the basis of the unique identifier. The SCEF then selectively forwards the SMS message depending on the operational status of the user equipment. If the user equipment is in an active mode and able to receive SMS messages, the SCEF forwards the SMS message to the MME, which sends the message to the user equipment on the basis of the unique identifier. If the user equipment is in an idle mode and available to be paged, the SCEF forwards the SMS message to the MME, which pages the user equipment and then sends the message to the user equipment when the user equipment responds to the page. If the user equipment is in a power saving mode and only available for paging at specific time intervals, the SMS message is buffered in either the SCEF or the MME. The buffered SMS message is then provided at the next paging opportunity, if possible. If the user equipment cannot be reached within a predetermined time interval, then the MME notifies the SCEF that the user equipment is not reachable.

Mobile originated SMS messages including the unique identifier of the user equipment are transmitted from the user equipment to the MME. The unique identifier is used to identify the SCEF that is registered with the user equipment to provide SMS messaging. The MME then forwards the SMS message to the identified SCEF, which maps the unique identifier to an external identifier. The SCEF uses the external identifier to identify the application server and then forwards the SMS message to the identified application server using the external identifier.

FIG. 1 illustrates a wireless communication system 100 that supports delivery of SMS messages according to the Third Generation (3G) standards defined by the Third Generation Partnership Project (3GPP). The wireless communication system 100 includes a radio access network (RAN) 105 that provides wireless connectivity to one or more user equipment 110 (only one user equipment is illustrated in FIG. 1 in the interest of clarity) within a geographic area or cell over a corresponding air interface 115. The radio access network 105 can implement one or more base stations (not shown in FIG. 1). As used herein, the term "base station" refers to any entity or device capable of providing wireless connectivity including eNodeBs, macrocells, access points, small cells, microcells, picocells, femtocells, and the like. As used herein, the term "user equipment" refers to any device or entity capable of accessing network services by establishing a wireless connection over the air interface 115 with the radio access network 105. For example, the user equipment 110 can include devices that are used to facilitate communication between people, such as cell phones, smart phones, tablet computers, wireless-enabled laptops, and the like. For another example, the user equipment 110 can include physical devices such appliances, vehicles, buildings, and other items that are embedded with electronics, software, sensors, actuators, and network connectivity that enable the devices to collect and exchange data over the Internet. The user equipment 110 can therefore be used as part of an "Internet of Things."

The radio access network 105 is connected to a mobility management entity (MME) 120. The MME 120 is responsible for paging idle user equipment, performing bearer activation/deactivation, authenticating user equipment, and the like. The MME 120 is also a terminating node for NAS signaling. The MME 120 is connected to a mobile switching center (MSC) 125, which is implemented in a circuit-switched portion 130 of the wireless communication system 100. The MSC 125 controls elements of a network switching subsystem for the wireless communication system 100. The MSC 125 is connected to a short message service (SMS) server 135 that is used to receive, store, and transmit SMS messages, which can be short messages that are constrained to include a maximum of 160 alphanumeric characters. The SMS server 135 is configured to receive and transmit the SMS messages along control plane paths in a circuit-switched network.

The portion 130 of the wireless communication system includes a home subscriber server (HSS) 140, which is a master user database that stores subscription-related information such as subscriber profiles associated with the user equipment 110. The HSS 140 also performs authentication and authorization of users and provides location and IP information for the user. A charging data function (CDF) 145 in the portion 130 is used to gather charging information for online charging or off-line charging for usage of the resources of the wireless communication system 100 by the user equipment 110. The CDF 145 can use the charging information to generate a call detail record (CDR), which can be sent to a billing system for the wireless communication system 100. A service capability server (SCS) 150 provides middleware that serves third-party value-added services and applications. The SCS 150 can be owned or leased by a mobile network operator or other network service provider and is accessible through application programming interfaces (APIs). The SMS 135, the HSS 140, the CDF 145, and the SCS 150 are connected to an interworking function 155 that provides interworking between the portion 130 and external networks such as packet-switched networks.

The SCS 150 communicates with a service capability exposure function (SCEF) 160 over a corresponding user plane path. The SCEF 160 is configured to securely expose the services and capabilities provided by network interfaces in the wireless communication system 100. For example, the SCEF 160 provides an interface for small data transfers and control messaging between the user equipment 110 and one or more application servers 165. The SCEF 160 provides APIs to the application server 165 for the small data transfers and control messages.

In order to receive SMS messages via the circuit-switched portion 130 of the wireless communication system 100, the user equipment 110 is required to establish a connection with a packet data network (PDN) 170. The user equipment 110 is identified using an IP address associated with the PDN connection. One or more bearers are used to convey the SMS messages using control plane signaling along a circuit-switched path that is supported by one or more of the bearers in the PDN connection. The circuit-switched path includes the SCEF 160 that receives SMS messages from the application server 165 or the MME 120. The circuit-switched path also includes the IWF 155, the HSS 140, the SMS 135, the MSC 125, and the MME 120.

Figure 2:
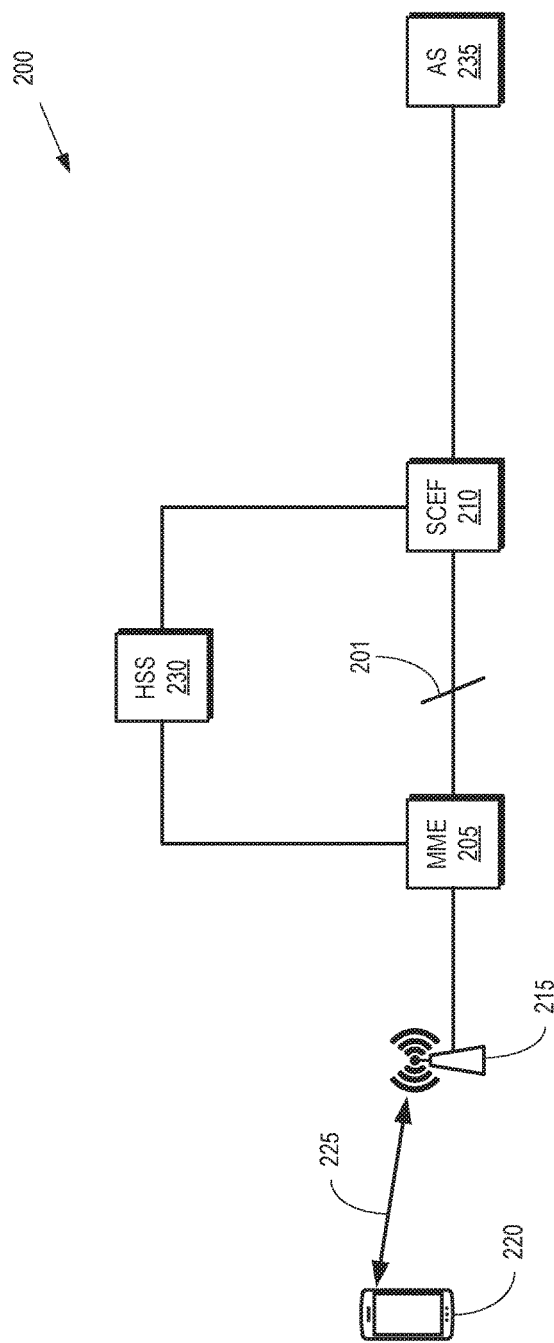
FIG. 2 illustrates a wireless communication system that supports delivery of SMS messages over an interface between a mobility management entity (MME) and a service capability exposure function (SCEF) that does not require establishing a packet data network (PDN) connection according to some embodiments.

FIG. 2 illustrates a wireless communication system 200 that supports delivery of SMS messages over an interface 201 between an MME 205 and an SCEF 210 that does not require establishing a PDN connection according to some embodiments. The wireless communication system 200 includes a radio access network (RAN) 215 that provides wireless connectivity to one or more user equipment 220 (only one user equipment is illustrated in FIG. 2 in the interest of clarity) within a geographic area or cell over a corresponding air interface 225. An HSS 230 provides a master user database that stores subscription-related information such as subscriber profiles associated with the user equipment 220. An application server 235 generates mobile-terminated SMS messages for transmission to the user equipment 220 and receives mobile-originated SMS messages from the user equipment 220.

The user equipment 220 is identified to the MME 205, the SCEF 210, and the HSS 230 by a unique identifier that is allocated to the user equipment 220. For example, the user equipment 220 is allocated an International Mobile Subscriber Identity (IMSI) that is used to identify the user equipment to the MME 205, the SCEF 210, and the HSS 230. An external identifier is used to identify the user equipment 220 to external entities such as the application server 235. One example of an external identifier is a mobile station international subscriber directory number (MSISDN). The SCEF 210 is configured to map the external identifier to the unique identifier of the user equipment 220. The MME 205 routes SMS messages on the basis of the unique identifier and the SCEF 210 is able to route messages on the basis of either the unique identifier or the external identifier, depending on the direction of the SMS message.

Mobile-terminated SMS messages are generated by the application server 235 for transmission to the user equipment 220. The mobile-terminated SMS messages therefore include the external identifier of the user equipment 220. The SCEF 210 receives the mobile-terminated SMS message and maps the external identifier to the unique identifier of the user equipment 220. The SCEF 210 also uses the unique identifier to identify the MME 205 that is connected to the RAN 215 that is serving the user equipment 220. Depending on the operational status of the user equipment 220, the SCEF 210 selectively forwards the SMS message.

Some embodiments of the user equipment 220 support three operational modes that indicate different statuses: an active mode in which the user equipment 220 is able to receive SMS messages, an idle mode in which the user equipment 220 is not able to receive SMS messages but is available to be paged, and a power saving mode in which the user equipment 220 is not able to receive SMS messages and is only available to be paged at certain paging time intervals. If the user equipment is in the active mode, the SCEF 210 forwards the SMS message to the MME 205, which sends the SMS message to the user equipment 220 on the basis of the unique identifier. If the user equipment is in the idle mode, the SCEF 210 forwards the SMS message to the MME 205, which pages the user equipment 220. If the user equipment 220 responds to the page, the MME 205 transmits the SMS message to the user equipment 220. If the user equipment is in the power saving mode, the SMS message is buffered in either the SCEF 210 or the MME 205. The MME 205 transmits a message to notify the SCEF 210 that the SMS message will be successfully delivered. The message also indicates a time of delivery. The buffered SMS message is then provided at the next paging opportunity, if possible. For example, the MME 205 pages the user equipment 220 at the next paging interval and forwards the SMS message if the user equipment 220 responds to the page. If the user equipment 220 cannot be reached within a predetermined time interval, then the MME 205 notifies the SCEF 210 that the user equipment 220 is not reachable. In that case, the SMS message is discarded.

The user equipment 220 generates mobile-originated SMS messages that include the unique identifier of the user equipment 220. The user equipment 220 transmits the mobile-originated SMS message to the MME 205, which uses the unique identifier included in the SMS message to identify the SCEF 210 that is registered with the user equipment 220 to support SMS messaging. The MME 205 forwards the SMS message to the identified SCEF 210, which maps the unique identifier to an external identifier. The SCEF 210 uses the external identifier to identify the application server 235 and then forwards the SMS message to the identified application server 235 using the external identifier.

Figure 3:
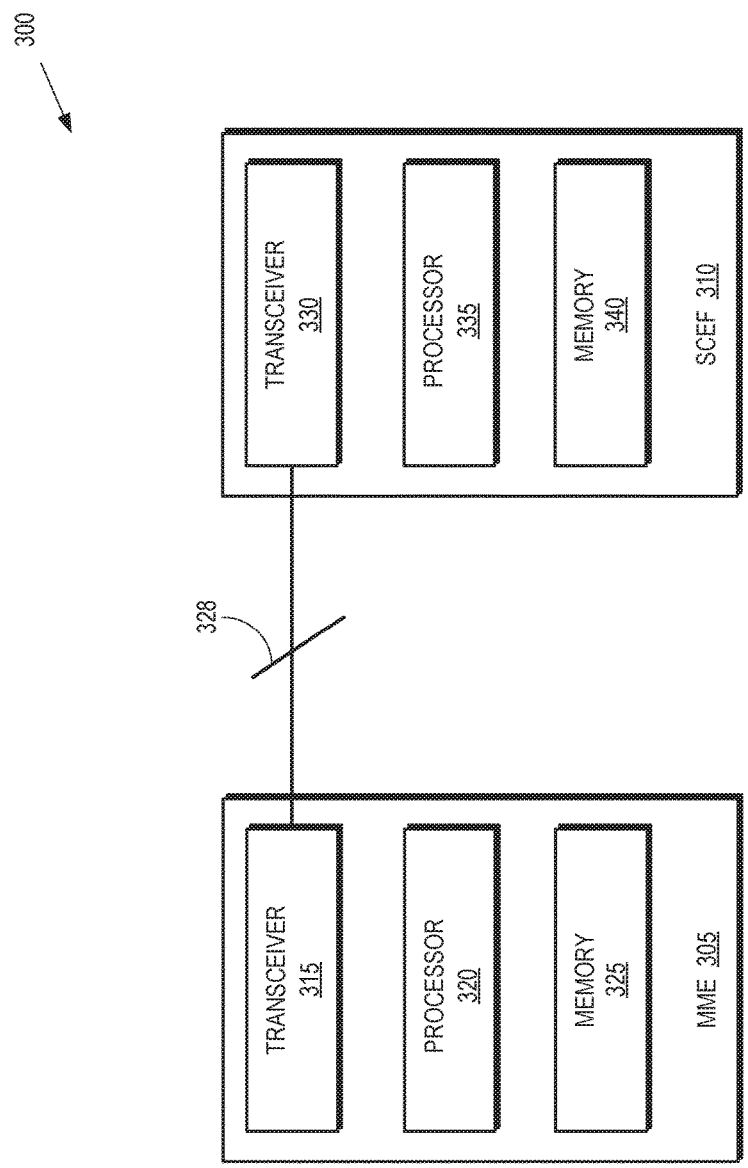
FIG. 3 is a block diagram of a communication system according to some embodiments.

FIG. 3 is a block diagram of a communication system 300 according to some embodiments. The communication system 300 includes an MME 305 that is used to implement some embodiments of the MME 205 shown in FIG. 2. The communication system 300 also includes and SCEF 310 that is used to implement some embodiments of the SCEF 210 shown in FIG. 2.

The MME 305 includes a transceiver 315 that is used to support communication over an interface 328 with the SCEF 310. The interface 328 is used to implement some embodiments of the interface 201 shown in FIG. 2. Some embodiments of the transceiver 315 are implemented using one or more receivers and one or more transmitters. The MME 305 also includes a processor 320 and a memory 325. The processor 320 is configured to execute instructions such as instructions stored in the memory 325 and the memory 325 is configured to store instructions, data that is to be operated upon by the instructions, or the results of instructions performed by the processor 320.

The SCEF 310 includes a transceiver 335 that is used to support communication over an interface 328 with the MME 305. Some embodiments of the transceiver 335 are implemented using one or more receivers and one or more transmitters. The SCEF 310 also includes a processor 335 and a memory 340. The processor 335 is configured to execute instructions such as instructions stored in the memory 340 and the memory 340 is configured to store instructions, data that is to be operated upon by the instructions, or the results of instructions performed by the processor 335.

Figure 4:
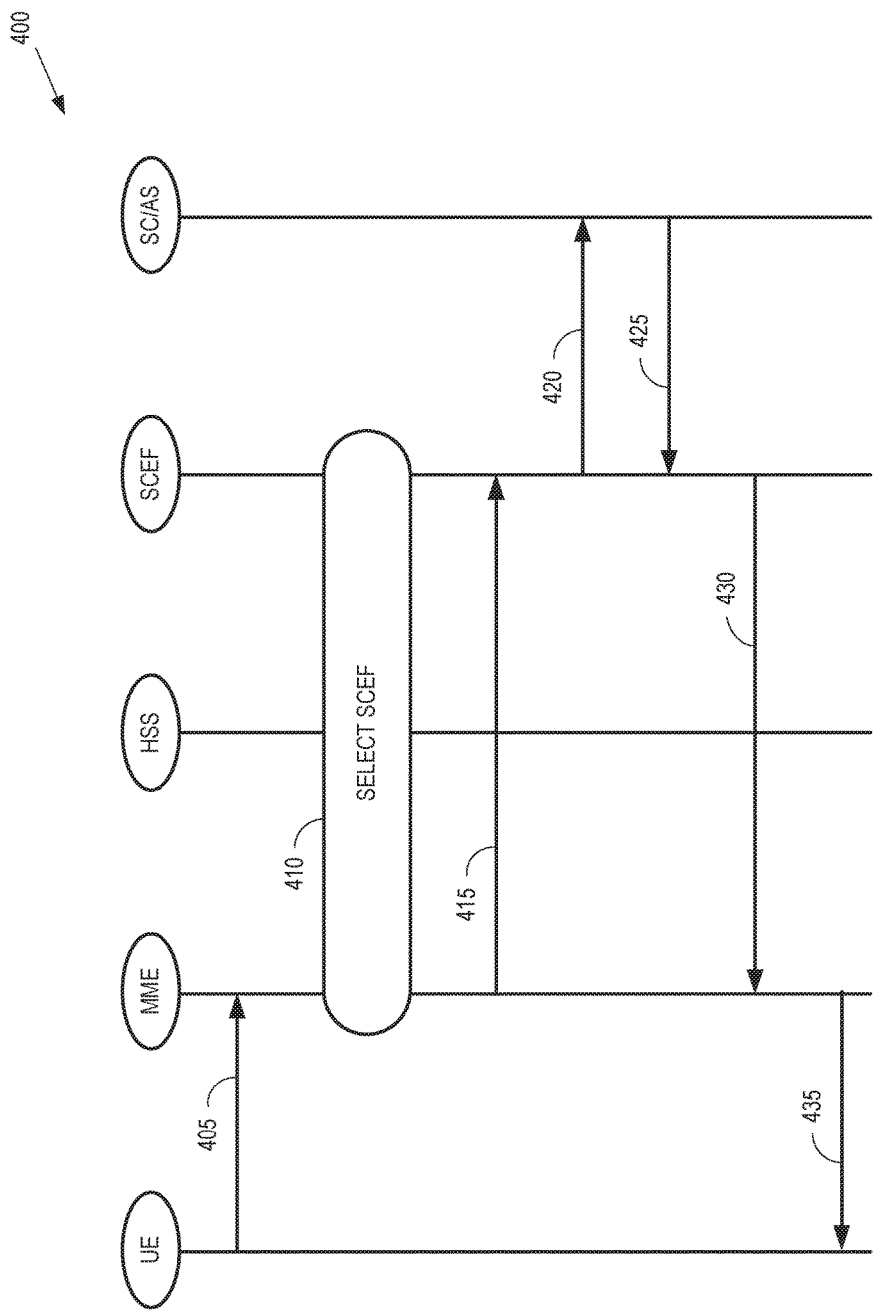
FIG. 4 illustrates a message flow that is used to register a user equipment for SMS messaging according to some embodiments.

FIG. 4 illustrates a message flow 400 that is used to register a user equipment for SMS messaging according to some embodiments. The message flow 400 is implemented in some embodiments of the wireless communication system 200 shown in FIG. 2.

The UE transmits a message 405 such as an attach or combined attach message that includes an indication that the UE is requesting SMS service. In response to receiving the message 405, the MME selects (at block 410) an SCEF to serve the UE. Some embodiments of the MME select the SCEF based on local provisioning rules established for SMS services. Some embodiments of the MME also perform authentication and authorization of the UE using information stored in the HSS.

The MME transmits a message 415 to the SCEF that includes a connection management request to register the UE for SMS messaging. Some embodiments of the message 415 use a modified format of the connection management request that includes information used to request SMS messaging for the UE. In response to receiving the message 415, the SCEF transmits a message 420 to notify the application server that the UE is available for SMS messaging. The application server transmits a response message 425 to the SCEF to acknowledge that the application server received the message 420 including the notification that the UE is available for SMS messaging.

The SCEF transmits a message 430 to the MME that includes a connection management answer including information indicating that the SCEF has registered the UE for SMS messaging and that the SCEF has notified the appropriate application server. In response to receiving the message 430, the MME transmits a message 435 indicating that the MME has accepted the UE request to attach and to receive SMS messaging. At this point, the UE is registered to exchange SMS messaging with the application server via the MME and the SCEF. Registering the UE in this manner does not require establishing a PDN connection to convey the SMS messaging.

Figure 5:
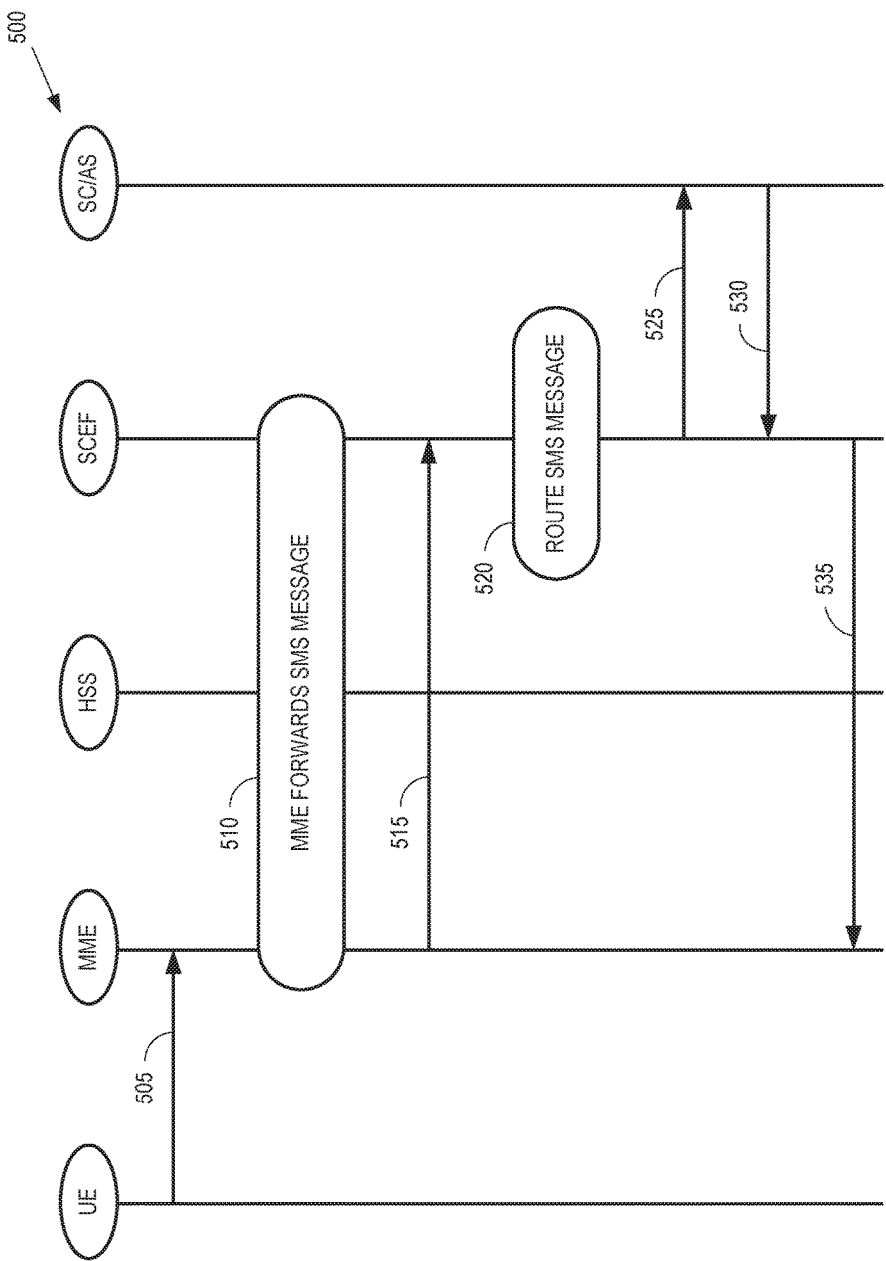
FIG. 5 illustrates a message flow that is used to convey a mobile-originated SMS message from a user equipment to an application server according to some embodiments.

FIG. 5 illustrates a message flow 500 that is used to convey a mobile-originated SMS message from a user equipment to an application server according to some embodiments. The message flow 500 is implemented in some embodiments of the wireless communication system 200 shown in FIG. 2.

The user equipment transmits a message 505 including the SMS message that is destined for the application server. Some embodiments of the message 505 are a downlink non-access stratum (NAS) message or a control plane service request that includes an NAS message container. The user equipment is identified in the message 505 using a unique identifier of the user equipment such as an IMSI. The MME forwards (at block 510) the SMS message to the SCEF. For example, the MME can forward the NAS message container to the SCEF.

The MME transmits a message 515 that includes a mobile-originated SMS delivery request, which identifies the application server using a destination address. In response to receiving the message 515, the SCEF routes (at block 520) the SMS message to the application server identified by the destination address. As discussed herein, the SCEF routes the SMS message by mapping the unique identifier of the user equipment to an external identifier such as an MSISDN.

The SCEF transmits a mobile-originated SMS delivery message 525 that includes the SMS to the application server, which responds with a message 530 to acknowledge reception of the SMS message. The mobile-originated SMS delivery message 525 is directed to the application server on the basis of the external identifier of the UE. The SCEF then transmits a mobile-originated SMS data delivery acknowledgment 535 to the MME, which transmits an acknowledgment message 540 in response to receiving the acknowledgment 535. Some embodiments of the acknowledgment message 540 are uplink NAS transport messages that include an NAS message container containing an acknowledgment packet.

Figure 6:
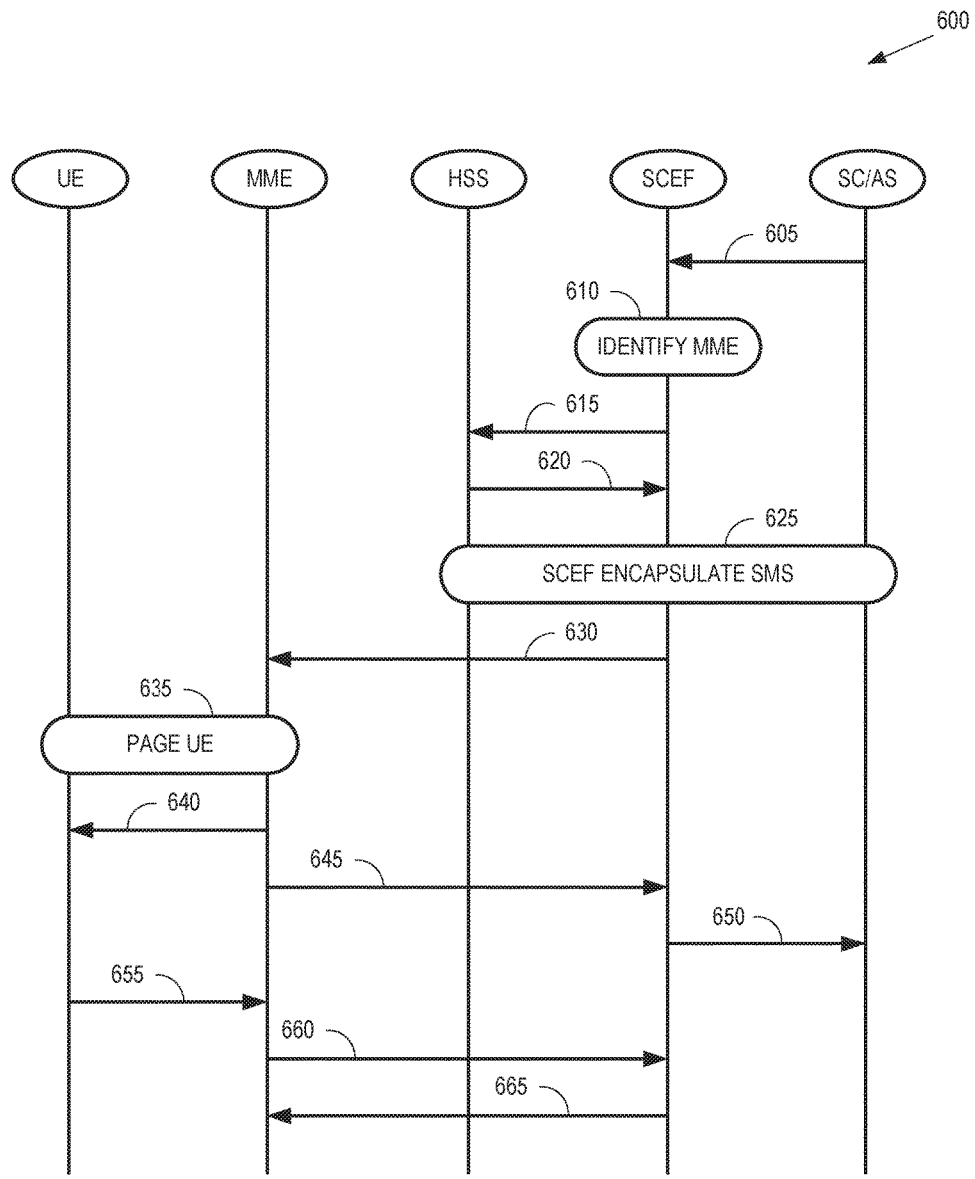
FIG. 6 illustrates a message flow that is used to convey a mobile-terminated SMS message from an application server to a user equipment that is able to receive SMS messaging according to some embodiments.

FIG. 6 illustrates a message flow 600 that is used to convey a mobile-terminated SMS message from an application server to a user equipment that is able to receive SMS messaging according to some embodiments. The message flow 600 is implemented in some embodiments of the wireless communication system 200 shown in FIG. 2.

The application server transmits a message 605 that includes an SMS message addressed to the UE using an external identifier of the UE such as an MSISDN. The SCEF maps (at block 610) the external identifier to a unique identifier of the UE such as an IMSI so that the SCEF is able to identify the MME that is serving the UE. In some embodiments, the SCEF does not have the unique identifier, in which case the SCEF transmits a message 615 to the HSS to request that the HSS resolve the external identifier to the unique identifier of the UE. The HSS is also able to provide information identifying the MME that serves the UE. The HSS responds by transmitting a message 620 that includes the requested information.

The SCEF encapsulates (at block 625) the mobile-terminated SMS message in a container message such as an NAS container. The SCEF then transmits a message 630 including the encapsulated mobile-terminated SMS message to the MME. The message 630 is addressed to the UE using the unique identifier of the UE.

If the UE is in an active mode and available to receive the SMS message, the MME forwards the SMS message to the UE. However, in the illustrated embodiment, the UE is in an idle mode and available to be paged by the MME. The MME therefore pages (at block 635) the UE using the unique identifier of the UE. In the illustrated embodiment, the UE responds to the page in block 635.

The MME transmits a message 640 including the encapsulated SMS message to the UE. Some embodiments of the message 640 are an uplink NAS transport message including an NAS message container that includes the SMS message. The MME also transmits a message 645 to the SCEF acknowledging that the SMS has been successfully delivered to the UE. In response to the message 645, the SCEF transmits a message 650 to the application server acknowledging that the SMS message has been successfully delivered to the UE.

The user equipment transmits a message 655 to the MME including an acknowledgment of receipt of the SMS message. Some embodiments of the message 655 are a downlink NAS message or a control plane service request that includes an NAS message container. The MME then transmits a mobile-originated SMS data delivery request 660 to the SCEF, which replies with an acknowledgment message 665 in response to receiving the acknowledgment 660.

Figure 7:
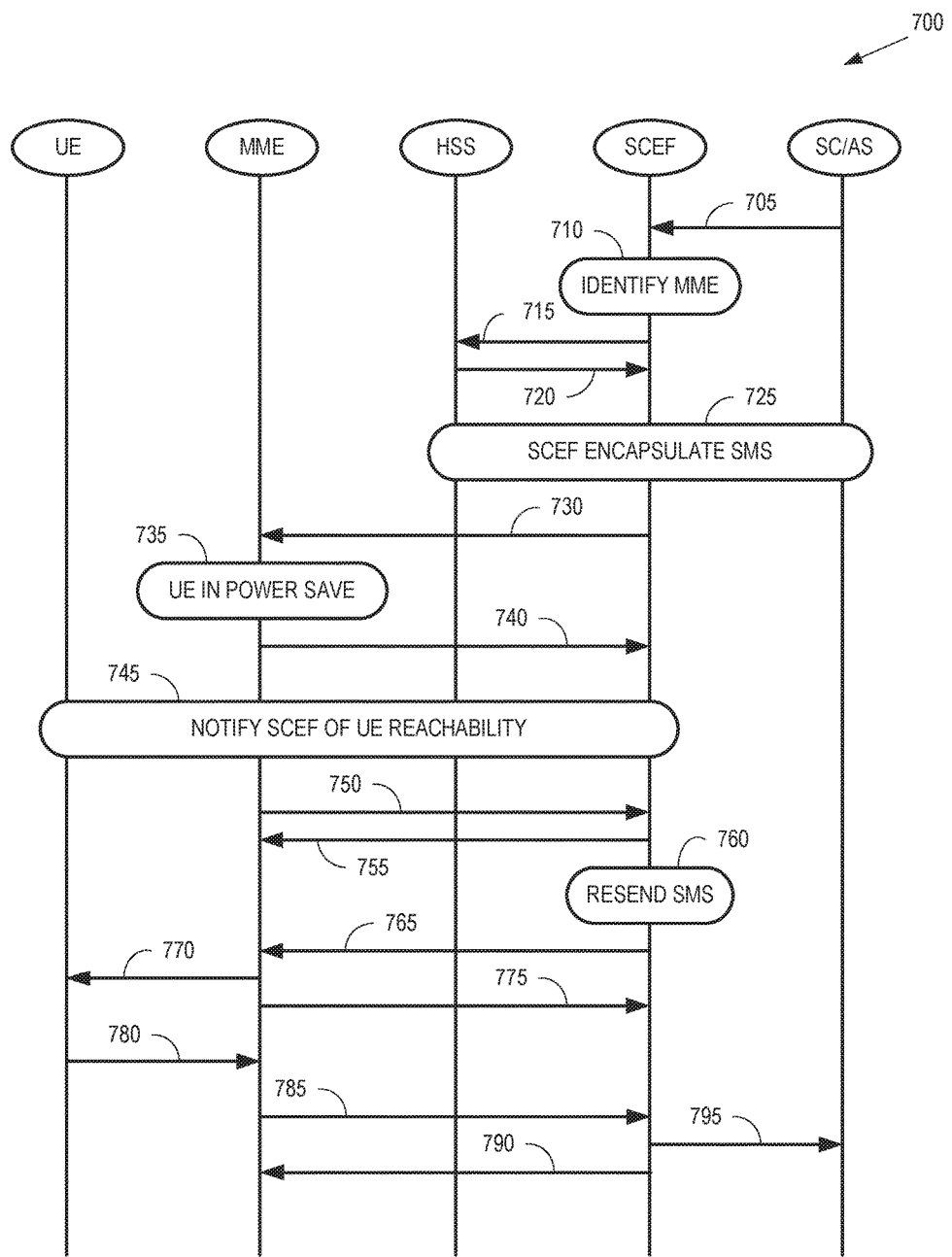
FIG. 7 illustrates a message flow that is used to buffer a mobile-terminated SMS message in an SCEF for subsequent delivery to a user equipment that is in a power saving mode according to some embodiments.

FIG. 7 illustrates a message flow 700 that is used to buffer a mobile-terminated SMS message in an SCEF for subsequent delivery to a user equipment that is in a power saving mode according to some embodiments. The message flow 700 is implemented in some embodiments of the wireless communication system 200 shown in FIG. 2.

The application server transmits a message 705 that includes an SMS message addressed to the UE using an external identifier of the UE such as an MSISDN. The SCEF maps (at block 710) the external identifier to a unique identifier of the UE such as an IMSI so that the SCEF is able to identify the MME that is serving the UE. In some embodiments, the SCEF does not have the unique identifier, in which case the SCEF transmits a message 715 to the HSS to request that the HSS resolve the external identifier to the unique identifier of the UE. The HSS is also able to provide information identifying the MME that serves the UE. The HSS responds by transmitting a message 720 that includes the requested information.

The SCEF encapsulates (at block 725) the mobile-terminated SMS message in a container message such as an NAS container. The SCEF then transmits a message 730 including a request to transmit the encapsulated mobile-terminated SMS message to the MME. The message 730 is addressed to the UE using the unique identifier of the UE.

In the illustrated embodiment, the UE is in a power saving mode and is only available to be paged at particular times indicated by a paging time interval. The MME determines that the UE is in the power saving mode at block 735. The MME also determines when the next paging time interval occurs. The MME then responds to the message 730 with a message 740 indicating that the UE is temporarily not reachable (due to the UE being in the power saving mode) and indicating when the UE will next be available to be paged for delivery of the SMS message. In response to receiving the message 740, the SCEF buffers the SMS message for delivery at the time indicated in the message 740.

The UE contacts the network at block 745 to indicate that the UE is available to receive SMS messaging. In some embodiments, the UE contacts the network in response to being paged by the MME at the time determined by the paging time interval. The UE is also able to contact the network in response to the UE transitioning from the power saving mode into an idle mode or an active mode.

The MME transmits a message 750 including a connection management update that indicates that the UE is reachable. In response to the message 750, the SCEF transmits an acknowledgment message 755.

The SCEF prepares the buffered SMS message for transmission to the UE at block 760. The SCEF transmits a message 765 including a delivery request for the SMS message included in the message 765. In response to receiving the message 765, the MME transmits a message 770 including the encapsulated SMS message to the UE. Some embodiments of the message 770 are an uplink NAS transport message including an NAS message container that includes the SMS message. The MME also transmits a message 775 to the SCEF acknowledging that the SMS has been successfully delivered to the UE.

The user equipment transmits a message 780 to the MME including an acknowledgment of receipt of the SMS message. Some embodiments of the message 780 are a downlink NAS message or a control plane service request that includes an NAS message container. The MME then transmits a mobile-originated SMS data delivery request 785 to the SCEF, which replies with an acknowledgment message 790 in response to receiving the acknowledgment 785. In response to the message 785, the SCEF also transmits a message 795 to the application server acknowledging that the SMS message has been successfully delivered to the UE.

Figure 8:
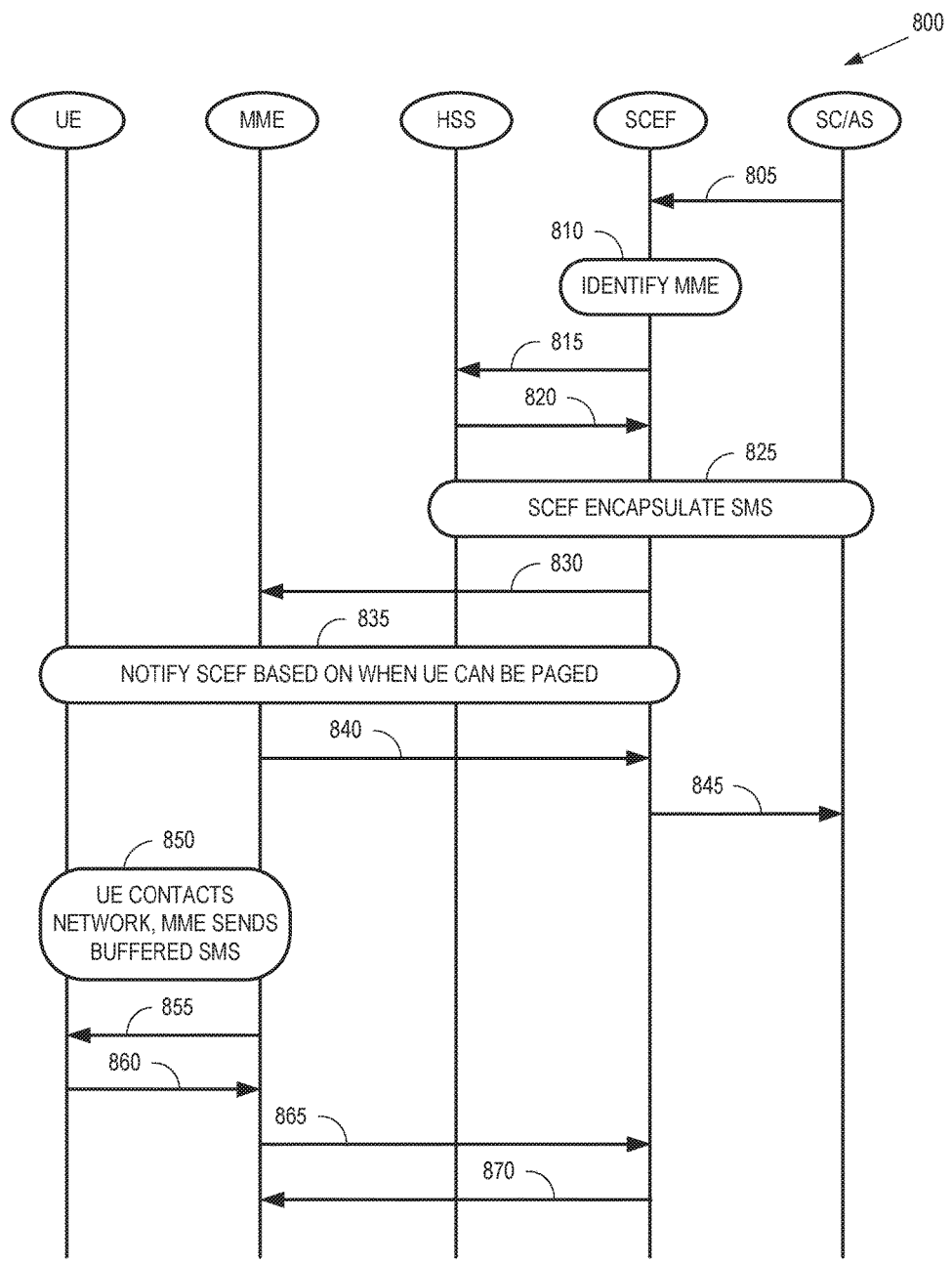
FIG. 8 illustrates a message flow that is used to buffer a mobile-terminated SMS message in an MME for subsequent delivery to a user equipment that is in a power saving mode according to some embodiments.

FIG. 8 illustrates a message flow 800 that is used to buffer a mobile-terminated SMS message in an MME for subsequent delivery to a user equipment that is in a power saving mode according to some embodiments. The message flow 800 is implemented in some embodiments of the wireless communication system 200 shown in FIG. 2.

The application server transmits a message 805 that includes an SMS message addressed to the UE using an external identifier of the UE such as an MSISIDN. The SCEF maps (at block 810) the external identifier to a unique identifier of the UE such as an IMSI so that the SCEF is able to identify the MME that is serving the UE. In some embodiments, the SCEF does not have the unique identifier, in which case the SCEF transmits a message 815 to the HSS to request that the HSS resolve the external identifier to the unique identifier of the UE. The HSS is also able to provide information identifying the MME that serves the UE. The HSS responds by transmitting a message 820 that includes the requested information.

The SCEF encapsulates (at block 825) the mobile-terminated SMS message in a container message such as an NAS container. The SCEF then transmits a message 830 including the encapsulated mobile-terminated SMS message to the MME. The message 830 is addressed to the UE using the unique identifier of the UE.

In the illustrated embodiment, the UE is in a power saving mode and is only available to be paged at particular times indicated by a paging time interval. The MME determines that the UE is in the power saving mode at block 835. The MME also determines when the next paging time interval occurs and selectively buffers the SMS message based on whether the UE will be available within a predetermined time interval. The MME then transmits a message 840 including an indication of the success or failure of the request and, if successful, a time of delivery of the SMS message to the UE. For example, if the MME determines that the UE will be available to be paged within a predetermined time interval, the MME buffers the SMS message and transmits the message 840 including an indication of successful delivery of the SMS message and the expected time of delivery. For another example, if the MME determines that the UE will not be available to be paged within the predetermined time interval, the MME discards the SMS message and transmits the message 840 including an indication of a failed delivery of the SMS message. In the case of a failed delivery, the message 840 can also include a cause such as "UE not reachable." In response to receiving the message 840, the SCEF forwards a message 845 to the application server including the acknowledgment information received in the message 840.

The UE contacts the network at block 850 to indicate that the UE is available to receive SMS messaging. In some embodiments, the UE contacts the network in response to being paged by the MME at the time determined by the paging time interval. The UE is also able to contact the network in response to the UE transitioning from the power saving mode into an idle mode or an active mode. The MME prepares the buffered SMS message for transmission to the UE at block 850. The MME then transmits a message 855 including the encapsulated SMS message to the UE. Some embodiments of the message 855 are an uplink NAS transport message including an NAS message container that includes the SMS message.

The user equipment transmits a message 860 to the MME including an acknowledgment of receipt of the SMS message. Some embodiments of the message 860 are a downlink NAS message or a control plane service request that includes an NAS message container. The MME then transmits a mobile-originated SMS data delivery request 865 to the SCEF, which replies with an acknowledgment message 870 in response to receiving the acknowledgment 865.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving, at a service capability exposure function (SCEF), a short message service (SMS) message associated with a user equipment;
   identifying, at the SCEF, a destination for the SMS message based on a mapping between a unique identifier of the user equipment and an external identifier of the user equipment; and
   transmitting, from the SCEF, the SMS message towards the destination via an interface between the SCEF and a mobility management entity (MME), wherein delivery of the SMS message over the interface does not require establishing a packet data network (PDN) connection with the destination.

2. The method of claim 1, wherein receiving the SMS message and transmitting the SMS message are performed without establishing the PDN connection for conveying the SMS message.

3. The method of claim 1, further comprising:
   notifying an application server that the user equipment is available for SMS messaging in response to an indication that the MME selected the SCEF for conveying SMS messages to the user equipment.

4. The method of claim 3, wherein receiving the SMS message comprises receiving a mobile-terminated SMS message from the application server, and wherein identifying the destination for the mobile-terminated SMS message comprises mapping the external identifier included in the mobile-terminated SMS message to the unique identifier of the user equipment.

5. The method of claim 4, further comprising:
   identifying the MME based n the unique identifier.

6. The method of claim 5, wherein transmitting the SMS message comprises selectively transmitting the mobile-terminated SMS message to the MME based on an operational status of the user equipment.

7. The method of claim 6, wherein selectively transmitting the mobile-terminated SMS message comprises transmitting the mobile-terminated SMS message to the MME in response to the user equipment being in an active mode and able to receive SMS messages.

8. The method of claim 6, wherein selectively transmitting the mobile-terminated SMS message comprises transmitting the mobile-terminated SMS message to the MME in response to the user equipment being in an idle mode and available to be paged.

9. The method of claim 6, wherein selectively transmitting the mobile-terminated SMS message comprises buffering the SMS message in the SCEF in response to the user equipment being in a power saving mode and only being available for paging at a paging time interval.

10. The method of claim 9, wherein selectively transmitting the mobile-terminated SMS message comprises transmitting the mobile-terminated SMS message at a next paging opportunity indicated by the paging time interval or discarding the mobile-terminated SMS message if the user equipment cannot be reached within a predetermined time interval.

11. The method of claim 3, wherein receiving the SMS message comprises receiving, from the MME, a mobile-originated SMS message including the unique identifier of the user equipment, wherein identifying the destination comprises mapping the unique identifier to an external identifier associated with the application server, and wherein transmitting the mobile-originated SMS message comprises transmitting the mobile-originated SMS message towards the application server.

12. A method comprising:
   receiving, at a mobility management entity (MME), a short message service (SMS) message associated with a user equipment over an interface with a service capability exposure function (SCEF), wherein delivery of the SMS message over the interface does not require establishing a packet data network (PDN) connection with the user equipment;

identifying, at the MME, a destination for the SMS message based on a unique identifier of the user equipment included in the SMS message; and transmitting, from the MME, the SMS message towards the destination.

13. The method of claim 12, wherein receiving the SMS message and transmitting the SMS message are performed without establishing the PDN connection for conveying the SMS message.

14. The method of claim 12, further comprising:
selecting, the SCEF in response to receiving an attach message from the user equipment including a request for SMS messaging.

15. The method of claim 14, wherein receiving the SMS message comprises receiving a mobile-terminated SMS message from the SCEF.

16. The method of claim 15, further comprising:
determining, at the MME, an operational status of the user equipment, wherein the operational status is one of an active mode and able to receive SMS messages, an idle mode in which the user equipment is available to be paged, and a power saving mode in which the user equipment is available to be paged at a paging time interval.

17. The method of claim 16, wherein transmitting the SMS message comprises transmitting the mobile-terminated SMS message to the user equipment based on the unique identifier in response to the user equipment being in the active mode.

18. The method of claim 16, wherein transmitting the SMS message comprises paging the user equipment in response to the user equipment being in the idle mode and transmitting the mobile-terminated SMS message to the user equipment based on the unique identifier in response to the user equipment responding to the page.

19. The method of claim 16, wherein transmitting the SMS message comprises buffering the mobile-terminated SMS message in response to the user equipment being in the power saving mode.

20. The method of claim 19, wherein transmitting the SMS message comprises transmitting the buffered mobile-terminated SMS message at the next paging opportunity indicated by the paging time interval or notifying the SCEF that the user equipment is not reachable if the user equipment cannot be reached within a predetermined time interval.

21. A service capability exposure function (SCEF) comprising:
a receiver configured to receive a short message service (SMS) message associated with a user equipment via an interface between the SCEF and a mobility management entity (MME), wherein delivery of the SMS message over the interface does not require establishing a packet data network (PDN) connection with the user equipment;
a processor configured to identify a destination for the SMS message based on a mapping between a unique identifier of the user equipment and an external identifier of the user equipment; and
a transmitter configured to transmit the SMS message towards the destination.

22. A mobility management entity (MME) comprising:
a receiver configured to receive a short message service (SMS) message associated with a user equipment via an interface between a service capability exposure function (SCEF) and the MME, wherein delivery of the SMS message over the interface does not require establishing a packet data network (PDN) connection with the user equipment;
a processor configured to identify a destination for the SMS message based on a unique identifier of the user equipment included in the SMS message; and
a transmitter configured to transmit the SMS message towards the destination.

* * * * *

UNITED STATES PATENT AND TRADEMARK OFFICE
CERTIFICATE OF CORRECTION

PATENT NO. : 10,484,844 B2
APPLICATION NO. : 15/855517
DATED : November 19, 2019
INVENTOR(S) : Padmavathi Sudarsan et al.

It is certified that error appears in the above-identified patent and that said Letters Patent is hereby corrected as shown below:

At Column 13, Claim 14, Line 15, please delete "selecting, the SCEF"" and insert --selecting, at the MME, the SCEF--.

Signed and Sealed this
Thirty-first Day of March, 2020

Andrei Iancu
*Director of the United States Patent and Trademark Office*